(12) United States Patent
Doering et al.

(10) Patent No.: US 12,033,016 B2
(45) Date of Patent: Jul. 9, 2024

(54) METHOD OF FORMING A PRELAM BODY OF A SMART CARD, A METHOD OF FORMING A SMART CARD, A PRELAM BODY, AND A SMART CARD

(71) Applicant: LINXENS HOLDING, Mantes-la-Jolie (FR)

(72) Inventors: Sven Doering, Dresden (DE); Lars Klemm, Dresden (DE); Carsten Nieland, Dresden (DE)

(73) Assignee: LINXENS HOLDING, Mantes-la-Jolie (FR)

( * ) Notice: Subject to any disclaimer, the term of this patent is extended or adjusted under 35 U.S.C. 154(b) by 9 days.

(21) Appl. No.: 18/014,686

(22) PCT Filed: Jul. 7, 2020

(86) PCT No.: PCT/IB2020/000591
§ 371 (c)(1),
(2) Date: Jan. 5, 2023

(87) PCT Pub. No.: WO2022/008941
PCT Pub. Date: Jan. 13, 2022

(65) Prior Publication Data
US 2023/0252260 A1    Aug. 10, 2023

(51) Int. Cl.
*G06K 19/077* (2006.01)
(52) U.S. Cl.
CPC . *G06K 19/07722* (2013.01); *G06K 19/07718* (2013.01); *G06K 19/07758* (2013.01); *G06K 19/07775* (2013.01)
(58) Field of Classification Search
CPC ................................................ G06K 19/07722

USPC .......................................................... 235/488
See application file for complete search history.

(56) References Cited

U.S. PATENT DOCUMENTS

2009/0184166 A1* 7/2009 Bhandarkar ..... G06K 19/07743
235/492

FOREIGN PATENT DOCUMENTS

| EP | 2068274 A1 | 6/2009 |
| WO | 2018158644 A1 | 9/2018 |

OTHER PUBLICATIONS

International Search Report and Written Opinion of the International Searching Authority for related International Application No. PCT/IB2020/000591, dated Mar. 11, 2021, 11 pages.

* cited by examiner

*Primary Examiner* — Rafferty D Kelly
(74) *Attorney, Agent, or Firm* — DITTHAVONG, STEINER & MLOTKOWSKI

(57) ABSTRACT

The present disclosure provides in various aspects for a method of forming a prelam body of a smart card and a prelam body of a smart card. In some illustrative embodiments, a prelam body of a smart card comprises at least one contact terminal patch, which comprises a patch base layer and a plurality of conductive pads provided on a surface of the patch base layer, wherein the plurality of conductive pads is arranged on the patch base layer in accordance with a predefined interconnection design, and a prelam sheet with a plurality of openings, each opening accommodating a dedicated one of the conductive pads, wherein the at least one contact terminal patch is mounted to the prelam sheet.

29 Claims, 8 Drawing Sheets

METHOD OF FORMING A PRELAM BODY OF A SMART CARD, A METHOD OF FORMING A SMART CARD, A PRELAM BODY, AND A SMART CARD

FIELD OF THE INVENTION

The present invention relates to a method of forming a prelam body of a smart card and a method of forming a smart card. Furthermore, the present invention relates to a prelam body of a smart card and to a smart card.

STATE OF THE ART

In general, a smartcard is a physical electronic authorization device, used to control access to a resource. Typically, a smart card is provided as a plastic card in the size of a credit card formed by a card body into which one or more electric and electronic elements, such as a chip, an antenna, contact elements and the like, is integrated, wherein after the integration, the card body is referred to as a smart card. Many smart cards include a pattern of metal contacts for electrical connection to the integrated chip and/or are configured to allow contactless or wireless communication with the smart card. In case of a contactless smart card, one or more antenna components are integrated into a body of the smart card so as to allow contactless or wireless interaction with a chip that is integrated into the smart card.

In order to increase the functionality of a smart card, more and more effort is made to include an increasing number of features into a single smart card. For example, one or more security feature modules are integrated into the card body of a smart card so as to increase the security of the smart card and/or one or more memory modules are integrated into a smart card for storing sensitive personal data. Another application of smart cards aims at using a smart card as a key such the smart card comprises keying means for allowing access to personal belongings such as a house, a car, a room in a hotel and the like. There is a wide variety of possible functional modules to be integrated into a smart card, such as a fingerprint sensor for implementing biometric cards and/or a dynamic CVV in order to implement dynamic CVV functionality, one or more chip modules, a display, battery modules, antenna modules and the like.

When equipping a smart card with an increasing number of features, an increasing number of interconnections is to be integrated into a card body of a smart card. For example, when realizing a contactless smart card having biometric security features, it may be possible that up to twenty interconnections between a printed circuit board and feature modules realizing contactless and biometric features, are required.

Current smart cards usually have dimensions similar to those of a credit card. A typical size of smart cards is given by ID-1 of the ISO/IEC 7810 standard which defines cards having nominally 85.60 mm by 53.98 mm (3.37 in×2.13 in). Another popular size is ID-000, which is nominally 25 mm by 15 mm (0.98 in×0.59 in) which is commonly used in SIM cards. In each case, a thickness is given by about 0.76 mm (0.030 in). Accordingly, the size of the smart card is to be considered as standardized and will therefore not change despite of an increasing number of features to be integrated into the smart card. Consequently, the sizes of interconnections have to be scaled when increasing the number of contacts and interconnections so as to allow an integration of an increased number of contacts and interconnections into the card body. It becomes an issue to provide a high quality of electrical interconnections among integrated features and integrated circuits in a card body and to ensure a reliably interconnection over a long lifetime of a smart card.

Upon scaling the size of contacts and interconnections, such as copper pads, in the card body of a smart card, several problems arise. For example, a high number of copper pads increases the complexity of an integration of copper pads into a card body. Furthermore, a placement of copper pads in conventional pick-and-place processes turns out to be less accurate when considering dimensional changes. On the one hand, this affects the tolerances of processes employed during the various stages in a smart card fabrication process, such as lamination, card cutting, card milling and embedding of one or more modules into the body. On the other hand, a misplaced copper pad impairs the reliable function of any module which is to be connected to this copper pad. For example, a thermal compression bonding (TCB) employed for equipping a card body with an antenna module by bonding a copper wiring of an antenna to copper pads in a card body, may cause a milling of copper wires (as conventionally required by TCB processes) as being difficult to control with scaled copper pads. These copper pads are currently considered as representing reliable, easy and cost efficient interconnections in the application of smart cards.

As an explicit example of a smart card, dual interface cards are known in the art. A dual interface card represents a type of smart card which comprises two interfaces for transmitting and receiving information, one interface being an electrical contact for galvanic connection and the other interface being configured for contactless transmittal or receipt of data, typically by means of an RF antenna. In dual interface cards, several specific connection terminal designs are known which were designed in view of different technical and application related constraints. As discussed above, when integrating more features into a dual interface cards, the number of interconnections increases, thereby requiring changes to the known specific connection terminal designs or even making a completely new designing of connection terminal designs necessary.

In particular, when integrating more functions into a dual interface card, the amount of pads to be positioned in the same available space provided by the body of the card, greatly increases. For example, typical dual interface cards without further functions have two connections, while the integration of one or more further electronic modules into the card increase the number of connections up to eight or ten or even more connections. The limited space of the card body makes a scaling of the pad size necessary, therefore making the assembly of pads into a prelam body or card body more difficult. An issue involved is the position accuracy of pads which becomes even more important when scaling pads sizes to lower dimensions. However, smaller pad sizes also lead to smaller tolerances with regard to the position of the pads to avoid possible mismatch between terminals in the card body and contacts of electronic modules integrated into the card at a later point. This means that conductive pads need to be properly held in place during the manufacturing of a prelam body. In current processes, a sticky tape to the prelam body temporarily fixes two large pads per dual interface card. This technique is not efficient for application to arrangements with multiple smaller conductive pads.

In general, it is therefore important to efficiently design an interconnection layout that allows accommodating various electronic modules associated with the functions to be integrated into a dual interface card, as well as arranging interconnections and connection terminals in the limited space of the body of a smart card in a manner such that a high quality of electrical contacts and interconnections among integrated features and integrated circuits in a card body is provided and a reliably interconnection over a long lifetime of a smart card is ensured.

It is an object of the present disclosure to provide a prelam body with multiple conductive pads that are arranged with high efficiency and in a cost effective manner. Herein, the size and design, as well as the routing of copper pads, are to be designed for efficient use of the space provided by the body of a smart card.

BRIEF SUMMARY

The above problems and objects are solved in the various aspects of the present disclosure. Some aspects relate to a method of forming a prelam body of a smart card in accordance with independent claim 1, a method of forming a smart card as defined in claim 15, a prelam body of a smart card in accordance with independent claim 16 and a smart card in accordance with claim 28. More advantageous embodiments are defined in the dependent claims 2 to 14 and 17 to 27.

Regarding the expression "prelam body" as used herein, it is understood as representing a prelaminated body with multiple layers of an insulating material, such as PVC, pre-laminated together. This prelaminated body represents an intermediate product obtained during fabrication of a smart card. For example, an illustrative prelam body may be obtained by fusing together different layers of a thermoplastic material into a single homogeneous sheet body, thereby embedding a substrate with at least one contact and/or interconnection into the prelam body.

Regarding the expression "body of a smart card", this expression as referred to in this description, means a physical body of a smart card. For example, depending on the stage during fabrication of a smart card, the body of a smart card at a given stage during fabrication represents the physical body of the smart card at the given stage during fabrication, which only comprises physical elements, which physically constitute the smart card at the given stage during fabrication. In another example, a body of a finalized smart card may be understood as comprising the prelam body and at least one feature module integrated therein.

Regarding the expression "card body", this expression means a prelam body having a top and/or bottom layer and one or more optional compensation layers mounted thereto. In particular, the card body represents the body of a smart card in the fabrication of a smart card at stages after preparation of a prelam body and prior to integrating at least one electronic module into the body of the smart card. In other words, a card body represents a body of a smart card at a stage of fabrication at which the geometric dimensions of the body comply with the geometric dimensions defined in accordance with ISO standards for a smart card.

In a first aspect, a method of forming a prelam body of a smart card is provided. In accordance with illustrative embodiments herein, the method comprises preparing at least one contact terminal patch, which is formed by a patch base layer and a plurality of conductive pads provided on a surface of the patch base layer, wherein the plurality of conductive pads is arranged on the patch base layer in accordance with a predefined interconnection design, preparing a prelam sheet having formed therein a plurality of openings, each opening being formed such that it accommodates for a dedicated one of the conductive pads, and mounting the at least one contact terminal patch to the prelam sheet.

Upon preparing the at least one contact terminal patch, a predefined interconnection design of conductive pads may be easily provided in an automated fabrication process. Herein, the conductive pads may be scaled to smaller sizes at a high accuracy on the contact terminal patch and the predefined interconnection design of conductive pads may be provided independent of any assembly or lamination process performed during the fabrication of a prelam body. Further, the patch base layer may be selected in accordance with the material used for fabricating the prelam body, e.g. PVC, PC or a similar thermoplastic material employed in the art of fabricating prelam bodies, such that a reliable integration of the at least one contact terminal patch into the fabrication of prelam bodies may be achieved. Accordingly, a prelam body with a predefined interconnection design of conductive pads integrated therein may be provided for automated fabrication of prelam bodies in a cost efficient way.

In a first embodiment of the first aspect, the method may further comprise preparing a covering layer, the covering layer having at least one recess formed therein, the at least one recess being formed to accommodate the at least one contact terminal patch. Herein, the preparing of the prelam sheet further comprises mounting the covering layer to the prelam sheet in alignment with the plurality of openings such that the at least one contact terminal patch accommodated into the at least one recess in the covering layer is also aligned with the plurality of openings in the prelam sheet such that the plurality of conductive pads of the at least one contact terminal patch is accommodated into the plurality of openings of the prelam sheet. The at least one recess in the prelam sheet represents at least one location at which the at least one contact terminal patch is located in the prelam body. The recess in the covering layer positions the contact terminal patch with regard to the prelam sheet. In case that more contact terminal patches are prepared for accommodation into the prelam sheet, a recess is formed for each of the contact terminal patches such that each contact terminal patch is accommodated into a dedicated one of the recesses, while the conductive pads of each contact terminal patch are also accommodated into respective ones of the openings in the prelam sheet. In this way, the recess(es) in the covering layer is(are) aligned with respective openings in the prelam sheet. The conductive pads and the contact terminal patches may be embedded into the prelam sheet and into the covering layer such that a position of the conductive pads and the contact terminal patches, respectively, remain fixed during the fabrication of prelam bodies and smart cards during subsequent processing.

In accordance with some illustrative examples of the first embodiment, a thickness of the covering layer is substantially equal to a thickness of the patch base layer of the at least one contact terminal patch. Accordingly, the prelam body may be provided with smooth surfaces at the side of the contact terminal patch and the covering layer.

In accordance with a second embodiment of the first aspect, a thickness of the prelam sheet is equal to a height of the conductive pads on the patch base layer of the at least one contact terminal patch. Accordingly, the patch may be accommodated into the prelam sheet such that upper exposed surfaces of the pads embedded into the prelam sheet are level with the surface of the prelam sheet in which the conductive pads are exposed.

In a third embodiment of the first aspect, the preparing of the at least one contact terminal patch may comprise preparing the base patch layer with a plurality of bonding holes in alignment with the predefined interconnection design, and subsequently forming the plurality of conductive pads on the base patch layer such that each bonding hole is arranged directly below a conductive pad of the plurality of conductive pads. An according configuration of the base patch layer may allow for bonding to the conductive pads from below the base patch layer. Accordingly, the conductive pads of the at least one contact terminal patch are accessible to bonding from the side of the patch base layer.

In a fourth embodiment of the first aspect, the at least one contact terminal patch is prepared in a reel-to-reel process, comprising: combining a band of a reel of patch base layer material on a band of a reel of conductive pad material into a stacked configuration such that one of the bands runs on top of the other of the bands, and cutting out the plurality of conductive pads from the band of conductive pad material running in the stacked configuration with the band of patch base layer material and equipping the band of patch base layer material with the plurality of conductive pads. Accordingly, the contact terminal patch(es) may be fabricated in an automated process.

In accordance with some illustrative embodiments of the fourth embodiment of the first aspect, the method may further comprise rolling-up the cut band of conductive pad material, and cutting out the at least one contact terminal patch from the band of conductive pad material equipped with the plurality of conductive pads. In case that a plurality of contact terminal patches is fabricated, individual ones of the plurality of contact terminal patches are cut out. This example of the reel-to-reel process allows a preparation of the at least one contact terminal patch in an easy and automated way, while collecting the cut band of conductive pad material for possible recycling of the material. Thus, an amount of waste material may be reduced.

In accordance with some further illustrative examples of the fourth embodiment, the method may further comprise applying an adhesive coating to the band of conductive pad material prior to combining both bands, wherein the plurality of conductive pads is fixed to the band of patch base layer by means of the adhesive coating. Accordingly, an efficient in-line equipment process of the patch base layer material with the conductive pads is provided for automated processes. In some specific examples herein, the adhesive coating may be one of a curable adhesive, which is thermally curable or UV curable or of a chemical binding type or a pressure sensitive adhesive, wherein the method further comprises a curing of the adhesive layer after equipping the band of patch base layer material with the plurality of conductive pads, and a component of a two-component adhesive, wherein the other component of the two-component adhesive is applied to the band of conductive pad material prior to equipping the band of patch base layer material. Such an adhesive coating may allow for a selective adhesion such that the conductive pads of the band of conductive pad material running in the second configuration with the band of patch base layer material is fixed onto the band of patch base layer material, via the cut out band of conductive pad material remaining after cutting out conductive pads is not adhered to the band of patch base layer material.

In a fifth embodiment of the first aspect, the preparing of the at least one contact terminal patch may comprise providing the at least one contact terminal patch with an edge mark which may acting as an alignment and orientation mark. Accordingly, a contact terminal patch may be correctly aligned and oriented when mounting to the prelam sheet.

In a sixth embodiment of the first aspect, the method may further comprise preparing a wiring layer by providing a wiring base layer with a wiring pattern formed on one surface of the wiring base layer, and mounting the wiring layer to the prelam sheet having the at least one contact terminal patch mounted thereto, wherein the wiring pattern faces the at least one contact terminal patch. Accordingly, a wiring pattern may be provided in the prelam body in addition to the interconnect structure provided by the at least one contact terminal patch. In accordance with some illustrative examples herein, the wiring pattern may comprise an antenna coil pattern (a partial antenna coil pattern or a complete antenna coil pattern), an interconnect wiring pattern for interconnecting at least two modules that are later integrated into a card body and the like.

In accordance with some illustrative examples herein, the patch base layer of the at least one contact terminal patch may have bonding holes formed therein and the wiring layer may have bonding holes formed therein, the wiring layer being mounted to the patch base layer of the at least one contact terminal patch such that the bonding holes of the wiring layer and the bonding holes of the patch base layer are aligned so as to substantially fall in line, wherein the mounting of the wiring layer to the prelam sheet comprises bonding wires of the wiring pattern being exposed by the bonding holes of the wiring layer to the conductive pads being exposed by the bonding holes in the patch base layer. Accordingly, a bonding of the wiring pattern to the conductive pads is possible from below the patch base layer.

In some alternative illustrative examples, the wiring layer may face the plurality of conductive pads of the at least one terminal patch and wires of the wiring pattern may be connected to the plurality of conductive pads mounting the wiring layer to the prelam sheet. Accordingly, the conductive pads may be easily bonded to the wiring pattern.

In some illustrative examples of the sixth embodiment of the first aspect, the wiring pattern alone or the combination with at least a subset of the plurality of conductive pads may realize an antenna pattern. Accordingly, the contact terminal patch may provide for an antenna pattern in conjunction with the wiring pattern in a repetitive way.

In a second aspect, a method of forming a smart card is provided. In accordance with illustrative embodiments herein, the method comprises forming a prelam body in accordance with the first aspect, forming one or more overlay layers on the prelam sheet or on the covering layer, wherein a card body is formed, and integrating at least one electronic module into the card body. Herein, the at least one contact terminal patch is at least partly coupled to the electronic module(s) and the wiring pattern.

In a third aspect, a prelam body of a smart card is provided. In accordance with illustrative embodiments herein, the prelam body comprises at least one contact terminal patch, which comprises a patch base layer and a plurality of conductive pads provided on a surface of the patch base layer, wherein the plurality of conductive pads is arranged on the patch base layer in accordance with a predefined interconnection design, and a prelam sheet with a plurality of openings, each opening accommodating a dedicated one of the conductive pads, wherein the at least one contact terminal patch is mounted to the prelam sheet.

The at least one contact terminal patch provides for a predefined interconnection design of conductive pads in an easy way. Herein, the conductive pads may be scaled to smaller sizes at a high accuracy on the contact terminal patch and the predefined interconnection design of conductive pads may be provided. Further, the patch base layer may be selected in accordance with the material used for fabricating the prelam body, e.g. PVC, PC or a similar thermoplastic material employed in the art of fabricating prelam bodies, such that a reliable integration of the at least one contact terminal patch into the fabrication of prelam bodies may be achieved. Accordingly, a prelam body with a predefined interconnection design of conductive pads integrated therein may be provided, wherein an exact and accurate positioning of conductive pads in the prelam body in accordance with a predefined interconnection design is provided by means of the at least one contact terminal patch.

In a first embodiment of the third aspect, the prelam body may further comprise a covering layer with at least one recess formed therein, the at least one recess accommodating the at least one contact terminal patch, wherein the covering layer is mounted to the prelam sheet in alignment with the plurality of openings such that the at least one contact terminal patch accommodated into the at least one recess in the covering layer is aligned with the plurality of openings in the prelam sheet, and wherein the plurality of conductive pads of the at least one contact terminal patch is accommodated into the plurality of openings of the prelam sheet.

In some illustrative examples herein, a thickness of the covering layer may be substantially equal to a thickness of the patch base layer of the at least one contact terminal patch. Accordingly, the prelam body may be provided with smooth surfaces at the side of the contact terminal patch and the covering layer.

In a second embodiment of the third aspect, a thickness of the prelam sheet may be equal to a height of the conductive pads on the patch base layer of the at least one contact terminal patch. Accordingly, the patch may be accommodated into the prelam sheet such that upper exposed surfaces of the pads embedded into the prelam sheet are level with the surface of the prelam sheet in which the conductive pads are exposed.

In a third embodiment of the third aspect, the at least one contact terminal patch may comprise a plurality of bonding holes formed in the base patch layer, the bonding holes being in alignment with the predefined interconnection design, wherein each bonding hole is arranged directly below a conductive pad of the plurality of conductive pads.

In a fourth embodiment of the third aspect, the plurality of conductive pads may be fixed to the patch base layer by means of an adhesive.

In a fifth embodiment of the third aspect, the at least one contact terminal patch may be provided with an edge mark acting as an alignment and orientation mark.

In a sixth embodiment of the third aspect, the prelam body may further comprise a wiring layer provided by a wiring pattern formed on one surface of a wiring base layer, wherein the wiring layer may be mounted to the prelam sheet facing the at least one contact terminal patch. Accordingly, the prelam body may have a wiring pattern.

In some illustrative examples herein, the patch base layer of the at least one contact terminal patch may have bonding holes formed therein and the wiring layer further may further have bonding holes formed therein, the wiring layer being mounted to the patch base layer of the at least one contact terminal patch such that the bonding holes of the wiring layer and the bonding holes of the patch base layer are aligned so as to substantially fall in line, wherein the wires of the wiring pattern are bonded to the conductive pads through the bonding holes. Accordingly, the conductive pads may be bonded to the wiring pattern from below the patch base layer.

In an alternative illustrative example, the wiring layer may face the plurality of conductive pads of the at least one contact terminal patch and wires of the wiring pattern may be connected to the plurality of conductive pads of the at least one contact terminal patch.

In some illustrative examples of the fifth embodiment, the wiring pattern alone or in combination with at least a subset of the plurality of conductive pads may realize an antenna pattern.

In a seventh embodiment of the third aspect, conductive pads may be copper pads in the shape of at least one of a line, an L, a square, a rectangular, a circle and the like when viewed in a top view.

In a fourth aspect, a smart card may be provided. In accordance with illustrative embodiments herein, the smart card may comprise a card body having the prelam body in accordance with the third aspect, one or more electronic modules integrated into the card body, wherein the one or more electronic modules and the wiring pattern are at least partly coupled to the at least one contact terminal patch.

In some illustrative embodiments of the first aspect, the plurality of conductive pads may be subjected to pressure for at least one of forming the conductive pads into a planar shape and mounting the conductive pads to the band of patch base layer material and deforming at least a portion of each of the conductive pads. Accordingly, a possible curved shape of conductive pads which may be caused by rotating tools, may be made planar and/or conductive pads may be fixed to the patch base layer by pressure.

In accordance with some illustrative embodiments of the third aspect, each of the conductive pads may represent a 3D shaped conductive pad structure, such as a substantially Z-shaped or substantially L-shaped or substantially U-shaped form. This may allow for an advantageous contacting of the conductive pad mounted to the patch base layer. For example, the patch base layer may have a plurality of recesses or holes, into which the conductive pads are partially inserted. This may expose a portion of the conductive pad for being contacted from two opposite sides of the patch base layer.

BRIEF DESCRIPTION OF THE DRAWINGS

Further aspects and illustrative embodiments of the present disclosure will be described in greater detail in connection with the accompanying drawings in the detailed description below, wherein the drawings are not to scale.

DETAILED DESCRIPTION

With regard to FIGS. 1a, 1b and 2, a contact terminal patch in accordance with various illustrative embodiments of the present disclosure will be described. Herein, FIGS. 1a and 2 show two possible realizations of a contact terminal patch, without limiting the present disclosure.

Figure 1A:
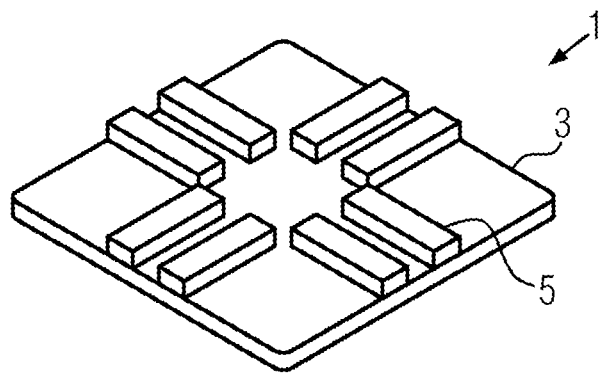
FIGS. 1a and 1b schematically show, in a perspective view, a contact terminal patch in accordance with some illustrative embodiments of the invention.

With regard to FIG. 1a, a contact terminal patch 1 is shown, the contact terminal patch comprising a patch base layer 3 and a plurality of conductive pads 5 being arranged on the patch base layer 3. As illustrated in FIG. 1a, the patch base layer 3 may have a quadrangular shape when seen in a top view. However, this does not pose any limitation to the present disclosure and any other shape of the patch base layer 3, such as a rectangular, polygonal, circular or any other shape in a top view may be realized for the patch base layer 3.

Figure 2:
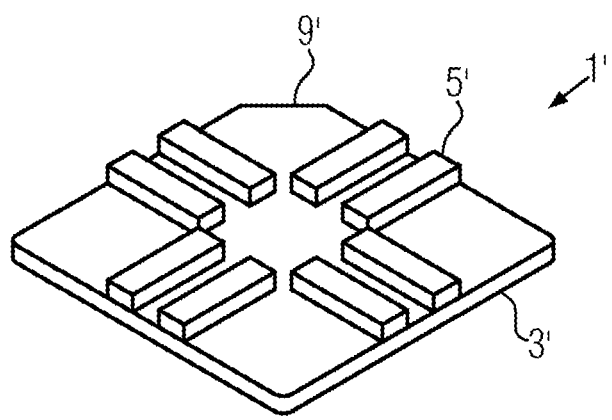
FIG. 2 schematically shows, in a perspective view, a contact terminal patch in accordance with some other illustrative embodiments of the present disclosure.

Referring to FIG. 2, an alternative embodiment is illustrated by means of a contact terminal patch 1', the contact terminal patch 1' having a patch base layer 3' and a plurality of conductive pads 5'. As opposed to the illustration FIG. 1a, the contact terminal patch 1' of FIG. 2 further has an edge mark 9', such as a further edge indicated by reference numeral 9'. However, this does not pose any limitation to the present disclosure and the mark 9' may have any other shape such as a flatted corner, one or more notches, a concave (e.g., an indention) or a convex shape (a projection or peak) of an edge, may be formed for providing a mark that allows to distinguish a specified orientation of the contact terminal patch 1' and assists in aligning the contact terminal patch 1' when integrating the contact terminal patch 1' into a prelam body (not illustrated). For example, a prelam sheet (not illustrated) to which the contact terminal patch 1' is mounted, may have a recess with a shape that represents a negative of the contact terminal patch 1' such that the contact terminal patch 1' may be snuggly fit into the recess of the prelam sheet (not illustrated).

Regarding FIG. 1b, a down view from below of the contact terminal patch 1 is illustrated, showing a lower surface or bottom surface of the patch base layer 3, i.e., a surface of the patch base layer 3 opposite to an upper surface or front surface of the contact terminal patch 1. Herein, an upper surface or front surface of the contact terminal patch 1 represents a surface of the contact terminal patch 1 on which the plurality of conductive pads 3 is arranged. As illustrated in FIG. 1b, a plurality of bonding holes 7 is formed in the patch base layer 3, the bonding holes 7 extending through the patch base layer 3 as through holes such that at least some of the plurality of conductive pads 5 on the front surface of the patch base layer 3 is accessible from a side at the bottom surface of the patch base layer 3. Although a single bonding hole is formed in the patch base layer 3 with respect to each conductive pad 5, this does not pose any limitation to the present disclosure and more than one bonding hole 7 may be provided in association with each of the conductive pads 5. It is also possible that only a subset of conductive pads 5 is associated to the bonding holes 7 such that at least one of the conductive pads 5 is not associated to a bonding hole 7, while one or more other conductive pads may be associated with at least one bonding hole 7.

In accordance with some illustrative embodiments of the present disclosure, the patch base layer 3, 3' may be a layer of PVC, PC or a similar thermoplastic material.

In accordance with some illustrative embodiments of the present disclosure, the conductive pads may be formed by at least one of copper, aluminum, gold, silver and an alloy including at least one of these materials.

In accordance with some illustrative embodiments of the present disclosure, the conductive pads 5, 5' may be provided in the shape of a line, in L, a square, a rectangular, a circle and the like when viewed in a top view, i.e., a view along a normal direction to the upper surface of the contact terminal patches 1, 1' in FIGS. 1a and 2. Furthermore, the plurality of conductive pads 5, on each of the patch base layer 3 (see FIGS. 1a and 1b) and the plurality of conductive pads 5' on the patch base layer 3' (see FIG. 2) may be provided in accordance with a predefined interconnection design. The predefined interconnection design may be determined when designing a smart card, wherein the predefined interconnection design represents a realization of a layout of interconnections that are employed in the smart card for establishing an electrical connection between different modules and/or wirings and/or contacts in a smart card to be developed.

Figure 1B:
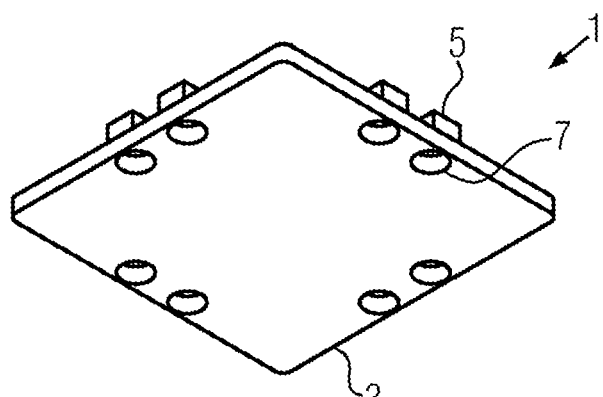
Figure 8:
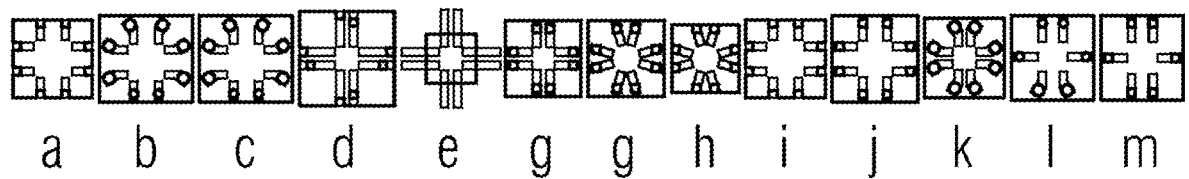
FIG. 8 schematically shows different layouts for contact terminal patches in accordance with some illustrative embodiments of the present disclosure.

The explicit arrangement of conductive pads as illustrated in FIGS. 1a, 1b and 2 of the present application is not limiting and, possible illustrative, but non-limiting arrangements of conductive pads are illustrated in FIGS. 8a to 8m. However, it is to be appreciated that the number and/or orientation of conductive pads as illustrated in FIG. 8 is not representing an exhaustive list of possible arrangements of conductive pads and thereby not limiting.

Referring to FIG. 8e, it is possible to arrange conductive pads on a patch base layer of a contact terminal patch such that the conductive pads are not bound to lie completely within a surface of the patch base layer in a top view. For example, as illustrated in FIG. 8e, at least one conductive pad of an arrangement of conductive pads may be arranged on a patch base layer such that the conductive pad partially extends beyond the surface of a patch base layer. Accordingly, conductive pads protruding away from a patch base layer along a direction that is not parallel to a normal direction to an upper surface of a patch base layer on which conductive pads are arranged.

Figure 3:
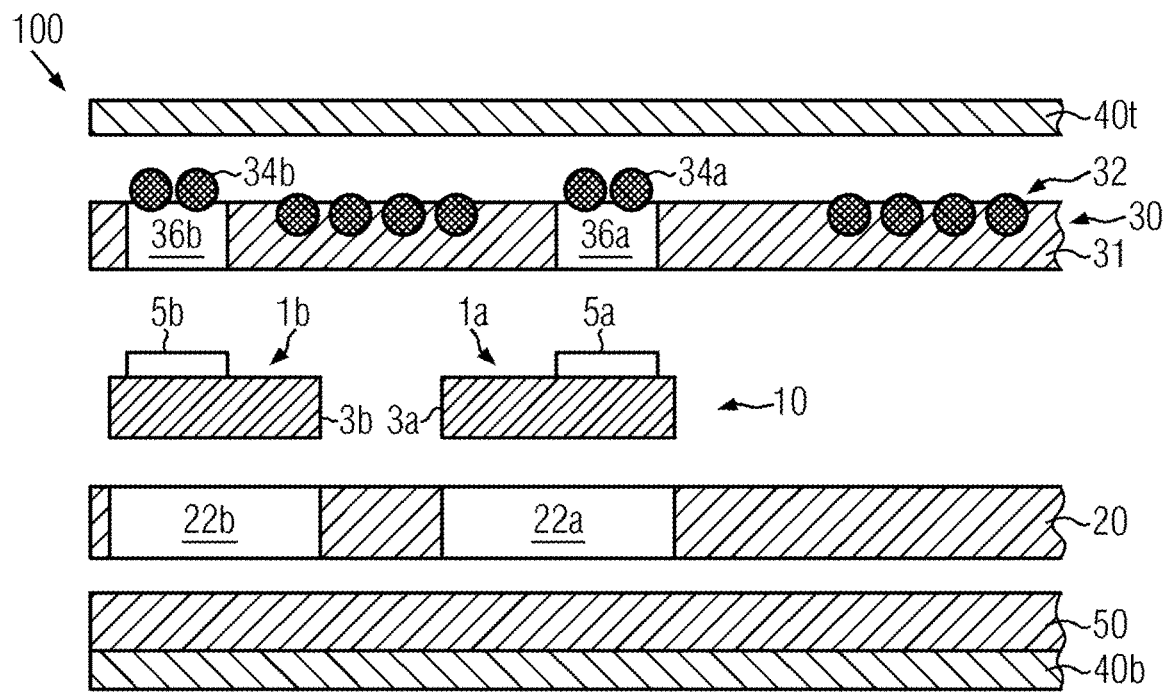
FIG. 3 schematically shows, in an exploded sectional view, a prelam body in accordance with some illustrative embodiments of the invention.

Referring to FIG. 3, an exploded cross-sectional view of a prelam body 100 in accordance with some illustrative embodiments of the present disclosure, it is schematically illustrated. The prelam body 100 comprises a plurality of contact terminal patches 10, a prelam sheet 20 and at least one insulating layer such as the first lamination layer 50 and a second lamination layer 40b, e.g. a bottom overlay sheet. The plurality of contact terminal patches 10 comprises a contact terminal patch 1a and a contact terminal patch 1b. This does not pose any limitations to the present disclosure and any number of terminal patches may be present, such as at least one contact terminal patch.

In accordance with some illustrative embodiments of the present disclosure, the prelam sheet 20 is of a bigger size than each of the contact terminal patches 1a and 1 b. The prelam sheet 20 as shown in FIG. 3 may be one layer of PVC or may be given by a plurality of sublayers (not illustrated), which in conjunction represent the prelam sheet 20.

The contact terminal patch 1a is formed by a patch base layer 3a and a plurality of conductive pads 5 formed on a surface of the patch base layer 3a. In the following, a surface of the patch base layer 3a on which the conductive patch 5a is provided is referred to as an upper surface or front surface, while an opposite surface of the patch base layer 3a is referred to as a lower surface or bottom surface. Similarly, the contact terminal patch 1b comprises a patch base layer 3b and a plurality of conductive pads 5b provided on a front surface of the patch base layer 3b. Each of the contact terminal patches 1a and 1b may be provided in accordance with a contact terminal patch as described above with regard to FIGS. 1a, 1b and 8.

With respect to the contact terminal patches 1a and 1b, an upper surface or front surface of the prelam body 20 is identified with a surface of the prelam body 20 close to the conductive pads 5a, 5b of the contact terminal patches 1a and 1b. Accordingly, an opposite surface to the upper surface or front surface of the prelam body 20 is identified as a lower surface or bottom surface of the prelam body 20. Referring to FIGS. 3, openings 22a and 22b are formed in the prelam sheet 20, each of the openings 22a, 22b, at least partially extending through the prelam sheet 20 along a thickness direction of the prelam sheet 20. Also FIG. 3 schematically illustrates the openings 22a and 22b as through holes completely extending through the prelam sheet 20 along a thickness direction of the prelam sheet 20, this does not pose any limitation to the present disclosure and the openings 22a and 22b may only be partially extend into the prelam sheet 20 along a thickness direction of the prelam sheet 20. Lateral sizes of the openings 22a and 22b may be such that the contact terminal patches 1a and 1b accommodate into the openings 22a and 22b with respect to length and width dimensions perpendicular to a thickness direction of the prelam sheet 20. In particular, an inner diameter of the openings 22a and 22b may be chosen such that the contact terminal patches 1a and 1b snuggly fit into the opening 22a and 22b with regard to the length and width dimensions of the contact terminal patches 1a and 1b.

In accordance with some illustrative embodiments of the present disclosure, a thickness of the prelam sheet 20 may correspond to a total height of each of the contact terminal patches 1a and 1 b such that upon inserting the contact terminal patches 1a and 1 b into the openings 22a and 22b, upper surfaces of the conductive pads 5a and 5b are substantially level with the upper surface of the prelam sheet 20.

In case of the openings 22a and 22b being through holes, as illustrated in FIG. 3, lower surfaces of the contact terminal patches 1a and 1b may be substantially level with the lower surface of the prelam sheet 20 when appropriately matching the thickness of the prelam sheet 20 with the total heights of the contact terminal patches 1a, 1b. Accordingly, the contact terminal patches 1a and 1b may be accommodated into the openings 22a and 22b without having an elevated portion of the contact terminal patches 1a and 1b extending beyond a surface of the prelam sheet 20. In this way, a reliable lamination of layers in a prelam body under fabrication is ensured.

On the front surface of the prelam sheet 20, after accommodating the contact terminal patches 1a and 1 b into the openings, a top overlay sheet 40t may be provided. Accordingly, a prelam body 100 may be formed from the prelam sheet 20 with accommodated contact terminal patches 1a and 1 b together with the layers 50, 40b and 50t on the upper and lower surfaces of the prelam sheet 20 as illustrated in FIG. 3.

In accordance with some illustrative embodiments of the present disclosure and as illustrated in FIG. 3, an optional wiring layer 30 may be provided, the wiring layer 30 comprising a wiring base layer 31 and a wiring pattern 32 formed in and/or on a surface of the wiring base layer 31. In accordance with some illustrative embodiments of the present disclosure, the wiring pattern 32 may implement an antenna coil pattern or, partially implement an antenna coil pattern.

In accordance with some illustrative embodiments of the present disclosure, the wiring layer 30 may be arranged, as shown in FIG. 3, on the front surface of the prelam sheet 20. However, this does not pose any limitation of the present disclosure and the wiring layer 30 may be formed in between the prelam sheet 20 and the layer 50 instead.

In accordance with some explicit illustrative, but non-limiting example herein, the prelam body 100 of FIG. 3 may be provided as follows. A top overlay sheet may be provided by layer 40t with a thickness of in the range from about 30 μm to about 60 μm (e.g., 50 μm) and may be formed from PVC or the like. An inlay sheet may be provided by the wiring layer 30 with a thickness of in the range from about 100 μm to about 150 μm (e.g., 130 μm) and may be formed from PVC or the like. An additional sheet may be provided by prelam sheet 20 with a thickness of in the range from about 50 μm to about 150 μm (e.g., 100 μm) and may be formed from PVC or the like. A further additional sheet may be provided by the layer 50 with a thickness of in the range from about 50 μm to about 150 μm (e.g., 100 μm) and may be formed from PVC or the like. A bottom overlay sheet may be provided by layer 40b with a thickness of in the range from about 30 μm to about 60 μm (e.g., 50 μm) and may be formed from PVC or the like.

With regard to FIGS. 4a to 4c, a fabrication of a card body of a smart card will be described in accordance with some illustrative embodiments of the present disclosure.

Figure 4A:
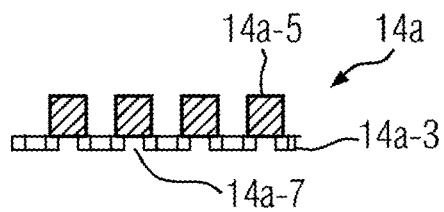
FIGS. 4a to 4c schematically show a fabrication of a card body in accordance with some illustrative embodiments of the present disclosure.

Referring to FIG. 4a, a contact terminal patch 14a is schematically illustrated in a cross sectional view. The contact terminal patch 14a comprises a patch base layer 14a-3 and a plurality of conductive pads 14a-5. In the patch base layer 14a-3 at least one bonding hole 14a-7 is formed in accordance with the bonding hole 7 as described above with regard to FIG. 1b, the disclosure of which is incorporated at this point by reference in its entirety.

Figure 4B:
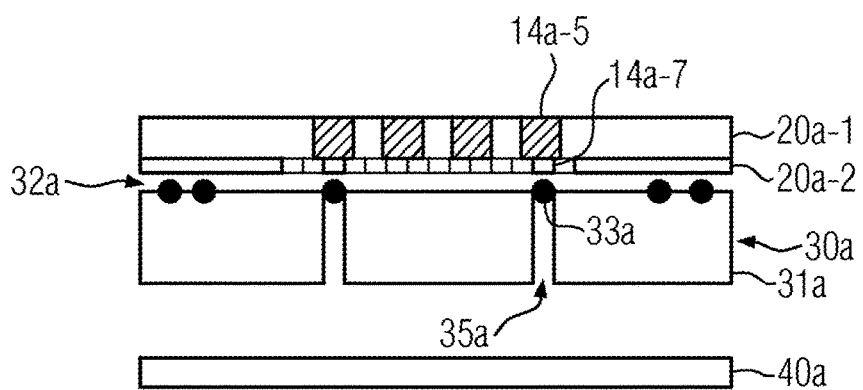

Referring to FIG. 4b, the contact terminal patch 14a of FIG. 4a is mounted to a prelam sheet 20a-1. The prelam sheet 20a-1 has a plurality of openings (not illustrated)

formed therein, the plurality of openings (not illustrated) being provided such that the plurality of conductive pads 14a-5 of the contact terminal patch 14a is, as shown in FIG. 4b, accommodated by the plurality of openings into the prelam sheet 20a-1 when mounting the contact terminal patch 14a to the prelam sheet 20a-1.

With continued reference to FIG. 4b, a covering layer 20a-2 may be provided on a surface of the prelam sheet 20a-1 in alignment with the contact terminal patch 14a. Particularly, the covering layer 20a-2 may have a recess (not illustrated) which is sized such that the patch base layer 14a-3 of the contact terminal patch 14a is completely accommodated into the recess.

In accordance with some illustrative embodiments herein, the prelam sheet 20a-1 may be equipped with the covering layer 20a-2. Herein, the plurality of openings (not illustrated) in the prelam sheet 20a-1 and the recess (not illustrated) in the covering layer 20a-2 are aligned with regard to each other such that the contact terminal patch 14a may be accommodated into the prelam sheet 20a-1 with the correct orientation of the contact terminal patch 14a. In accordance with some illustrative embodiments, the contact terminal patch 14a may be mounted to the prelam sheet 20a-1 prior to mounting the covering layer 20a-2 to the prelam sheet 20a-1 or vice versa.

In accordance with some illustrative embodiments of the present disclosure, a thickness of the covering layer 20a-2 may be substantially equal to a thickness of the patch base layer 14a-3 of the contact terminal patch 14a.

In accordance with some illustrative embodiments of the present disclosure, a thickness of the prelam sheet 20a-1 may be equal to a height of the conductive pads 14a-5 on the patch base layer 14a-3 of the contact terminal patch 14a.

In accordance with some illustrative embodiments of the present disclosure, a wiring layer 30a comprising a wiring base layer 31a and a wiring pattern 32a, may be prepared. The wiring pattern 32a may be formed on and/or in a surface of the wiring base layer 31a.

The prepared wiring layer 30a may be mounted to the prelam sheet 20a-1, 20a-2 having the plurality of contact terminal patches mounted thereto. Herein, the wiring pattern 32a of the wiring layer 30a faces the contact terminal patch 14a when mounting the wiring layer 30a to the prelam sheet 20a-1 together with the covering layer 20a-2.

With regard to FIG. 4b, the bonding holes 14a-7 and bonding holes 35a formed in the wiring base layer 31a are aligned such that the bonding holes of the patch base layer 14a-3 and the bonding holes of the wiring base layer 31a fall in line. When mounting the wiring layer 30a to the prelam sheet 20a-1 and the covering layer 20a-2a bonding of wires 33a of the wiring pattern 32a is performed, the wires being exposed by the bonding holes 35a of the wiring layer 30a to the conductive pads 14a-5 of the contact terminal patch 14a.

In accordance with some illustrative examples herein, when bonding the wiring pattern 32a to the conductive pads 14a-5, a bonding tip (not illustrated) may be inserted into the bonding hole 35a. The bonding tip (not illustrated) may drive the wire 33a through the bonding hole 14a-7 to the conductive pad 14a-5 and, subsequently, a bonding may be performed to permanently bond the wire 33a to the conductive pad 14a-5. In accordingly proceeding with all the wires 33a being exposed by bonding holes 35a a reliable bonding of these wires 33a to respective conductive pads 14a-5 may be achieved. The prelam body may be finalized by mounting a bottom layer 40a and an optional top layer (not illustrated) on the opposing sides to the configuration shown in FIG. 4b.

Figure 4C:
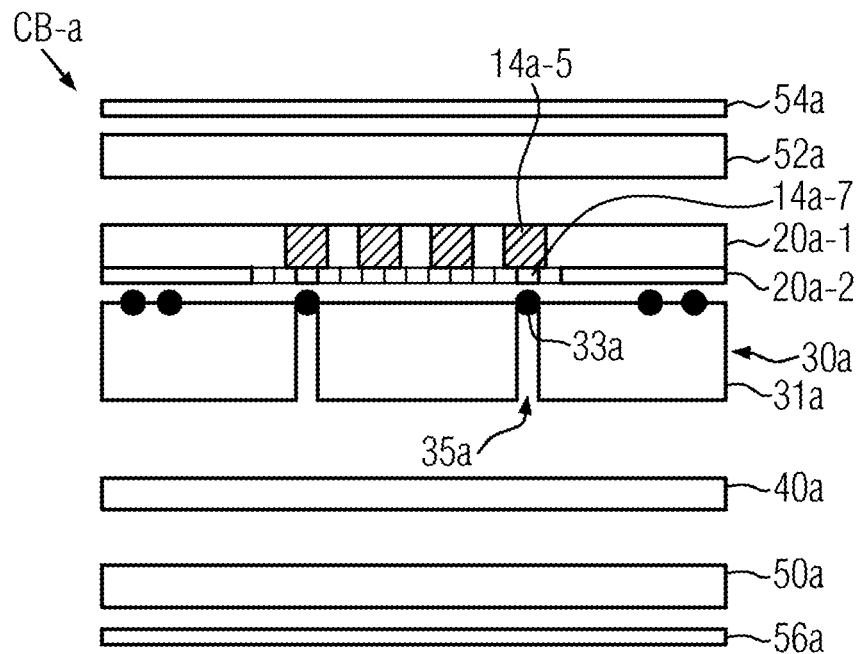

Referring to FIG. 4c, a card body CB-a is prepared by further arranging a printing foil 50a together with an overlay 56a on the bottom and a printing foil 52a together with an overlay 54a on the front of the prelam body.

In accordance with some illustrative embodiments of the present disclosure, the layers 20a-1 and 20a-2 may combine and correspond to the layer 20 as shown in FIG. 3. Accordingly, the description above of the prelam body 100 of FIG. 3 may apply to the disclosure in FIG. 4b in an according way.

With regard to FIGS. 5a to 5c, a fabrication of a card body of a smart card will be described in accordance with some illustrative embodiments of the present disclosure.

Figure 5A:
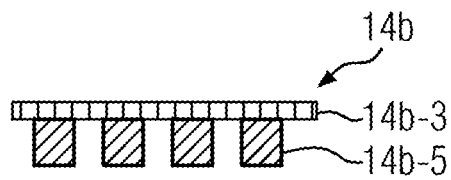
FIGS. 5a to 5c schematically show a fabrication of a card body in accordance with some other with some illustrative embodiments of the present disclosure.

Referring to FIG. 5a, a contact terminal patch 14b is schematically illustrated in a cross sectional view. The contact terminal patch 14b comprises a patch base layer 14b-3 and a plurality of conductive pads 14b-5. Contrary to the illustration in FIG. 4a, there are no bonding holes formed in the patch base layer 14b-3. Taking this into account, the contact terminal patch 14b may be formed in accordance with the contact terminal patch 1, 1' as described above with regard to FIGS. 1a and 2, the respective disclosure being incorporated at this point by reference in its entirety.

Figure 5B:
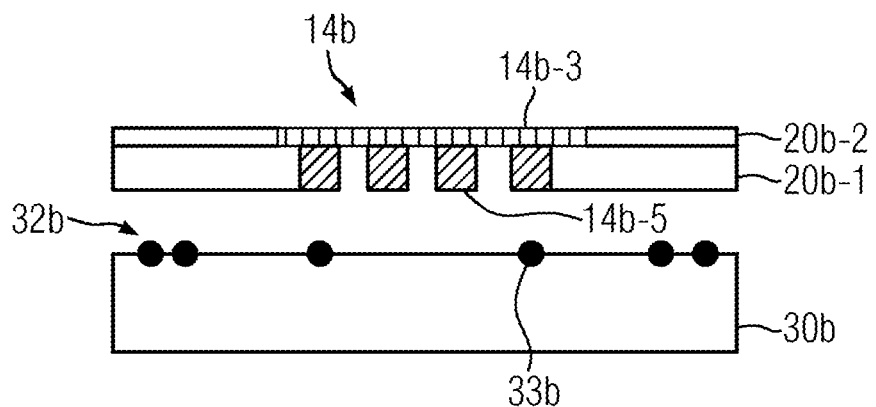

Referring to FIG. 5b, the contact terminal patch 14b of FIG. 5a is mounted to a prelam sheet 20b-1. The prelam sheet 20b-1 has a plurality of openings (not illustrated) formed therein, the plurality of openings (not illustrated) being provided such that the plurality of conductive pads 14b-5 of the contact terminal patch 14b is, as shown in FIG. 5b, accommodated by the plurality of openings into the prelam sheet 20b-1 when mounting the contact terminal patch 14b to the prelam sheet 20b-1. With regard to the illustration in FIG. 5b, the contact terminal patch 14b is mounted to the prelam sheet 20b such that the patch base layer 14b-3 of the contact terminal patch 14b rests on an upper surface or front surface of the prelam sheet 20b-1. Accordingly, surfaces of the conductive pads 14b-5 are exposed at a lower surface or bottom surface of the prelam sheet 20b-1 when the contact terminal patch 14b is mounted to the prelam sheet 20b-1.

With continued reference to FIG. 5b, a covering layer 20b-2 may be provided on the upper surface of the prelam sheet 20b-1 in alignment with the contact terminal patch 14b. Particularly, the covering layer 20b-2 may have a recess (not illustrated) which is sized such that the patch base layer 14b-3 of the contact terminal patch 14b is completely accommodated into the recess.

In accordance with some illustrative embodiments herein, the prelam sheet 20b-1 may be equipped with the covering layer 20b-2. Herein, the plurality of openings (not illustrated) in the prelam sheet 20b-1 and the recess (not illustrated) in the covering layer 20b-2 are aligned with regard to each other such that the contact terminal patch 14b may be accommodated into the prelam sheet 20b-1 with the correct orientation of the contact terminal patch 14b. In accordance with some illustrative embodiments, the contact terminal patch 14b may be mounted to the prelam sheet 20b-1 prior to mounting the covering layer 20b-2 to the prelam sheet 20b-1 or vice versa.

In accordance with some illustrative embodiments of the present disclosure, a thickness of the covering layer 20b-2 may be substantially equal to a thickness of the patch base layer 14b-3 of the contact terminal patch 14b.

In accordance with some illustrative embodiments of the present disclosure, a thickness of the prelam sheet 20b-1 may be equal to a height of the conductive pads 14b-5 on the patch base layer 14b-3 of the contact terminal patch 14b.

In accordance with some illustrative embodiments of the present disclosure, a wiring layer 30b comprising a wiring base layer 31b and a wiring pattern 32b, may be prepared. The wiring pattern 32b may be formed on and/or in a surface of the wiring base layer 31b.

The prepared wiring layer 30b may be mounted to the prelam sheet 20b-1, 20b-2 having the plurality of contact terminal patches mounted thereto from below the prelam sheet 20b-1. For example, the wiring layer 30b is mounted to the prelam sheet 20b-1 at the lower surface of the prelam sheet 20b-1 and at a surface of the prelam sheet 20b-1 opposite the covering layer 20b-2. The wiring pattern 32b of the wiring layer 30b faces the contact terminal patch 14b when mounting the wiring layer 30b to the prelam sheet 20b-1, particularly, the wiring pattern 32b faces exposed surfaces of the conductive pads 14b-5 of the contact terminal patch 14b mounted to the prelam sheet 20b-1. Accordingly, the wires 33b may be directly bonded to the exposed surfaces of the conductive pads 14b-5 of the contact terminal patch 14b.

Figure 5C:
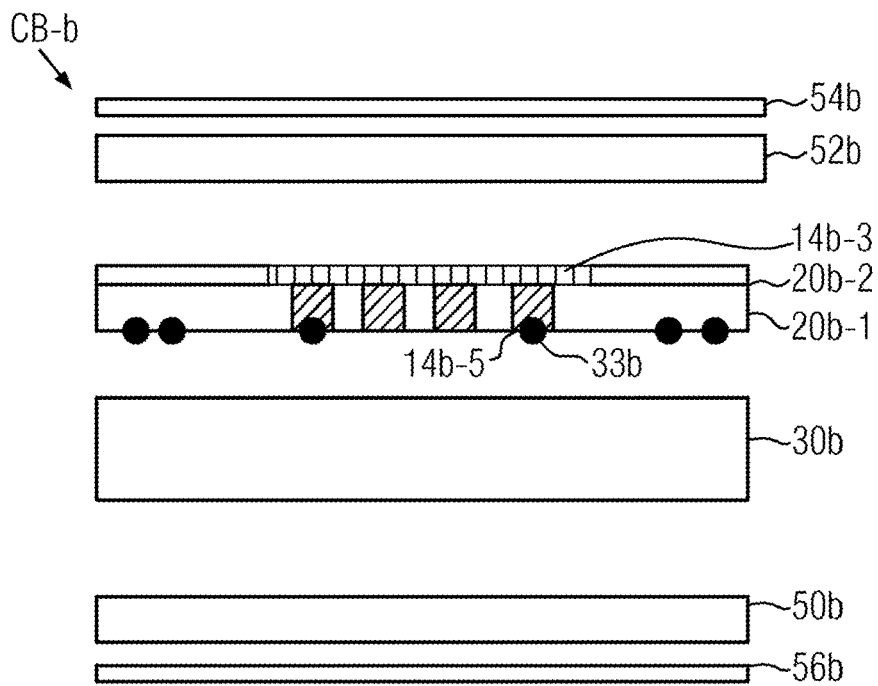

Referring to FIG. 5c, a card body CB-b is prepared by further arranging a printing foil 50b together with an overlay 56b on a bottom and a printing foil 52a together with an overlay 54b on the front of the prelam body.

In accordance with some illustrative embodiments of the present disclosure, the layers 20b-1 and 20b-2 may combine and correspond to the layer 20 as shown in FIG. 3. Accordingly, the description above of the prelam body 100 of FIG. 3 may apply to the disclosure in FIG. 5b in an according way.

Figure 6A:
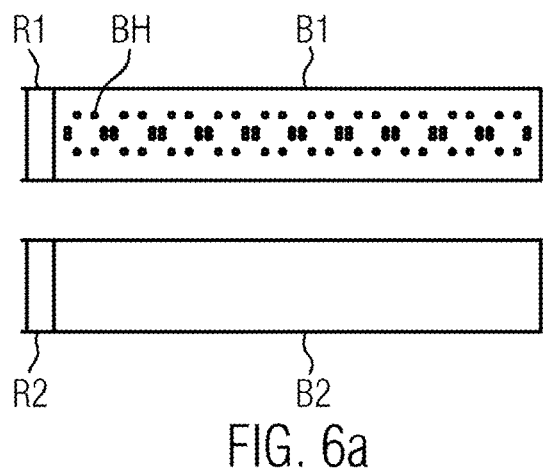
FIGS. 6a to 6c schematically show a fabrication of contact terminal patches in accordance with some illustrative embodiments of the present disclosure.
Figure 6B:
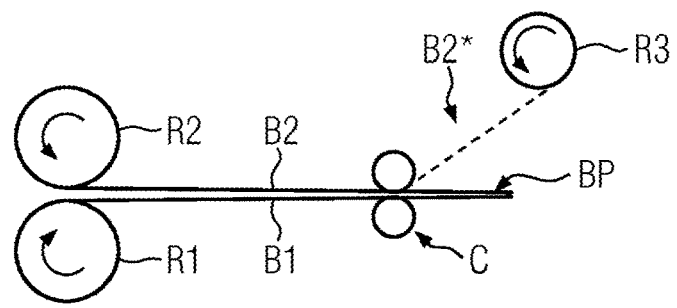
Figure 6C:
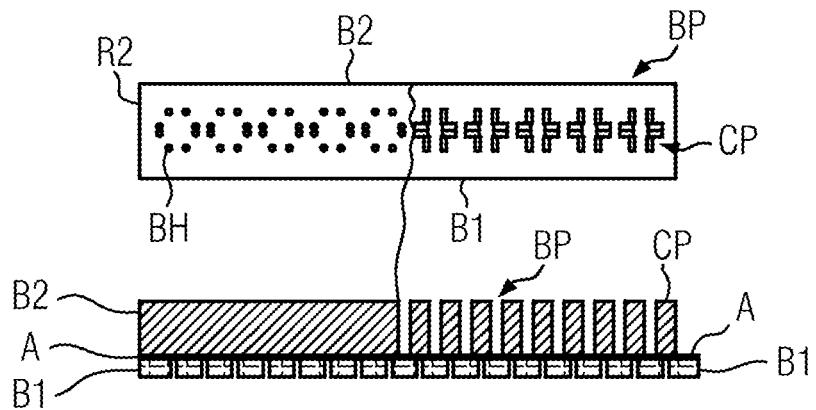

Referring to FIGS. 6a to 6c, a fabrication process for forming contact terminal patches in accordance with some illustrative embodiments of the present disclosure is presented.

Referring to FIG. 6a, a top view on a reel R1 is shown, the reel R1 of a patch base layer material providing a band B1 of a patch base layer material. The patch base layer material of the band B1 may be provided with bonding holes BH. For example, the patch base layer material on the reel R1 may be rolled out to provide a band and, in accordance with some predefined pattern and bonding holes BH may be formed in the patch base layer material rolled out of the reel R1 such that the band B1 of patch base layer material is provided as shown in FIG. 6a. Furthermore, a reel R2 may be provided, the reel R2 providing a band B2 of conductive pattern material.

Referring to FIG. 6b, a reel-to-reel process for fabricating a plurality of contact terminal patches is shown. According to some illustrative embodiments herein, the reel R2 of conductive pad material may be arranged with regards to reel R1 of patch base layer material such that the band B2 of reel R2 and the band B1 of reel R1 are combined in a stacked configuration, e.g. by biasing both bands towards each other such that the bands B2 is arranged in a stack configuration over the band B1. The bands B2 and B1 may be combined to run on top of each other in the stacked configuration and converge towards each other without coming in physical contact prior to a workstation C. At the workstation C, a processing may be subjected to the bands B2 and B1 as follows. The band B2 may be exposed to a cutting means for cutting out a plurality of conductive pads in the band B2 running in the stacked configuration with the band of patch base layer material B1. The cut conductive pads as formed at the workstation C may be provided to the band B1 of base layer material, for example by pressing the conductive pads onto the band B1 and fixing the conductive pads on the band B1. For example, the band B1 may be fused together with the patterned band B2 which represents the conductive pads cut out from the band B2 at the workstation C. In accordance with some optional examples herein, the cut band B2* representing the remaining band B2 without the cut conductive pads, may be rolled up at a reel R3 for collecting the conductive pad material and giving the chance to recycle this waste material. Accordingly, a band of patches BP is obtained after the workstation C as shown in FIG. 6b.

Referring to FIG. 6c, a top view on the stacked configuration of bands B2 and B1 of FIG. 6b before and after the workstation C is shown. In the top view of FIG. 6c, the reel R2 and the band B2 is directly visible. The bonding holes BH are not visible but indicated in FIG. 6c for clarity reasons, showing that the band capital B1 runs under the band B2 in a stacked configuration.

Referring to FIG. 6c, the band BP is illustrated after the workstation C, wherein conductive pads CP are present on the band B1 of patch base material, resulting in the band of patches BP. FIG. 6c also illustrates the same flow in a sectional view illustrating the stacked configuration of bands B1 and B2 before workstation C and after workstation C, where conductive pads CP are provided on the band B1.

Referring to FIG. 6c, an adhesive layer A is provided between the band B2 and the band B1. For example, the adhesive layer A may be supplied to at least one of the bands B1 and B2 at the workstation C prior to cutting and fixing the cut conductive pads toward the band B1. In accordance with some illustrative but non-limiting examples herein, a curable adhesive layer A may be employed, which is thermally curable or UV curable, wherein the curable adhesive layer A is supplied to one of the bands B1 and B2, such as the band B1, and a curing of the curable adhesive is performed after the band B2 is cut and the conductive pads CP are formed and the band of cut material B2* is diverging from the stacked configuration after the work workstation C. In another illustrative embodiment, the adhesive layer A may be a two component adhesive. In this case, one component of the two component adhesive layer A is supplied to the band B2, while the other component of the two components adhesive is supplied to the band B1. However, in this case, the two components are brought together after the conductive pads CP are formed and the waste material B2* is diverging. In a special illustrative example, one of the components may be supplied to the respective band of the bands B1 and B2 in accordance with the pattern of pads CP to be provided on the band B1. In this way, only the conductive pad material of band B2 at the location of the component adheres to the band B1. For example, the adhesive layer A may be supplied in a pattern corresponding to a pattern of conductive pads to be formed on the band B1.

In accordance with some illustrative embodiments, the band B1 of conductive pad material may have a perforation (not illustrated) formed on one side of the band B1. The perforation (not illustrated) may allow to precisely position conductive pads on the band B1. Particularly, the perforation may serve as a reference marking with respect to an arrangement of conductive pads on the band B1.

In accordance with some illustrative embodiments, an adhesive may be based on pressure sensitive adhesive, thermal reactive adhesive, UV activated adhesive or chemical binding adhesive. That may be applied in a specific pattern or a curing may be induced in accordance with a specific pattern.

In accordance with some subsequent processing, the band BP of patches may be cut to result in at least one contact terminal patch. For example, a patch as discusses with regard to FIGS. 1a, 1b, 2, 3 and 4a-4c may be produced in the process as described above with regard to FIGS. 6a to 6c.

Figure 7A:
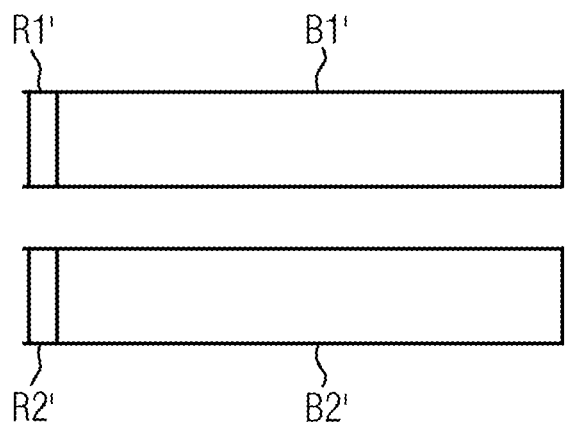
FIGS. 7a to 7c schematically show a fabrication of contact terminal patches in accordance with some other illustrative embodiments of the present disclosure.
Figure 7B:
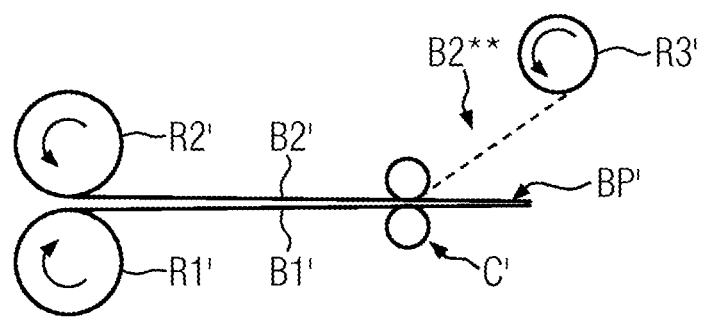
Figure 7C:
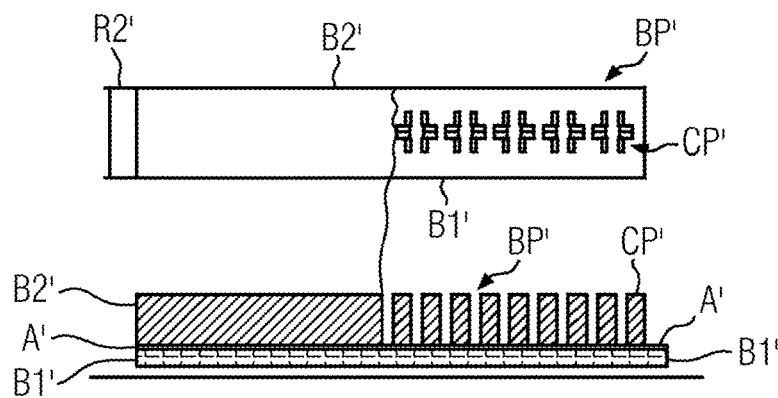

Referring to FIGS. 7a to 7c, another fabrication process for forming contact terminal patches in accordance with some other illustrative embodiments of the present disclosure is presented.

Referring to FIG. 7a, a top view on a reel R1' is shown, the reel R1' of a patch base layer material providing a band B1' of a patch base layer material. Furthermore, a reel R2' may be provided, the reel R2' providing a band B2' of conductive pattern material.

Referring to FIG. 7b, a reel-to-reel process for fabricating a plurality of contact terminal patches is shown. According to some illustrative embodiments herein, the reel R2' of conductive pad material may be arranged with regards to reel R1' of patch base layer material such that the band B2' of reel R2' and the band B1' of reel R1' are combined in a stacked configuration, e.g. by biasing both bands towards each other such that the bands B2' is arranged in a stack configuration over the band B1'. The bands B2' and B1' may be combined to run on top of each other in the stacked configuration and converge towards each other without coming in physical contact prior to a workstation C'. At the workstation C', a processing may be subjected to the bands B2' and B1' as follows. The band B2' may be exposed to a cutting means for cutting out a plurality of conductive pads in the band B2' running in the stacked configuration with the band of patch base layer material B1'. The cut of conductive pads as formed at the workstation C' may be provided to the band B1' of base layer material, for example by pressing the conductive pads onto the band B1' and fixing the conductive pads on the band B1'. For example, the band B1' may be fused together with the patterned band B2' which represents the conductive pads cut out from the band B2' at the workstation C'. In accordance with some optional examples herein, the cut band B2** representing the remaining band B2' without the cut conductive pads, may be rolled up at a reel R3' for collecting the conductive pad material and giving the chance to recycle this waste material. Accordingly, a band of patches BP' is obtained after the workstation C' as shown in FIG. 7b.

Referring to FIG. 7c, a top view on the stacked configuration of bands B2' and B1' of FIG. 7b before and after the workstation C' is shown. In the top view of FIG. 7c, the reel R2' and the band B2' is directly visible. It is to be understood that the band capital B1' runs under the band B2' in a stacked configuration and therefore is not directly visible in the top view illustration of FIG. 7c.

Referring to FIG. 7c, the band BP is illustrated after the workstation C', wherein conductive pads CP' are present on the band B1' of patch base material, resulting in the band of patches BP'. FIG. 7c also illustrates the same flow in a sectional view illustrating the stacked configuration of bands B1' and B2' before workstation C' and after workstation C', where conductive pads CP' are provided on the band B1'.

Referring to FIG. 7c, an adhesive layer A' is provided between the band B2' and the band B1'. For example, the adhesive layer A' may be supplied to at least one of the bands B1' and B2' at the workstation C' prior to cutting and fixing the cut conductive pads toward the band B1'. In accordance with some illustrative but non-limiting examples herein, a curable adhesive layer A' may be employed, which is thermally curable or UV curable, wherein the curable adhesive layer A' is supplied to one of the bands B1' and B2', such as the band B1', and a curing of the curable adhesive is performed after the band B2' is cut and the conductive pads CP' are formed and the band of cut material B2 is diverging from the stacked configuration after the work workstation C'. In another illustrative embodiment, the adhesive layer A' may be a two component adhesive. In this case, one component of the two component adhesive layer A' is supplied to the band B2', while the other component of the two component adhesive is supplied to the band B1'. However, in this case, the two components are brought together after the conductive pads CP' are formed and the waste material B2 is diverging. In a special illustrative example, one of the components may be supplied to the respective band of the bands B1' and B2' in accordance with the pattern of pads CP' to be provided on the band B1'. In this way, only the conductive pad material of band B2' at the location of the component adheres to the band B1'. For example, the adhesive layer A' may be supplied in a pattern corresponding to a pattern of conductive pads to be formed on the band B1'.

In accordance with some illustrative embodiments, the band B1' of conductive pad material may have a perforation (not illustrated) formed on one side of the band B1'. The perforation (not illustrated) may allow to precisely position conductive pads on the band B1'. Particularly, the perforation may serve as a reference marking with respect to an arrangement of conductive pads on the band B1'.

In accordance with some illustrative embodiments, an adhesive may be based on pressure sensitive adhesive, thermal reactive adhesive, UV activated adhesive or chemical binding adhesive. That may be applied in a specific pattern or a curing may be induced in accordance with a specific pattern.

In accordance with some subsequent processing, the band BP' of patches may be cut to result in at least one contact terminal patch. For example, a patch as discusses with regard to FIGS. 1a, 2, 3 and 5a-5c may be produced in the process as described above with regard to FIGS. 7a to 7c.

Figure 9:
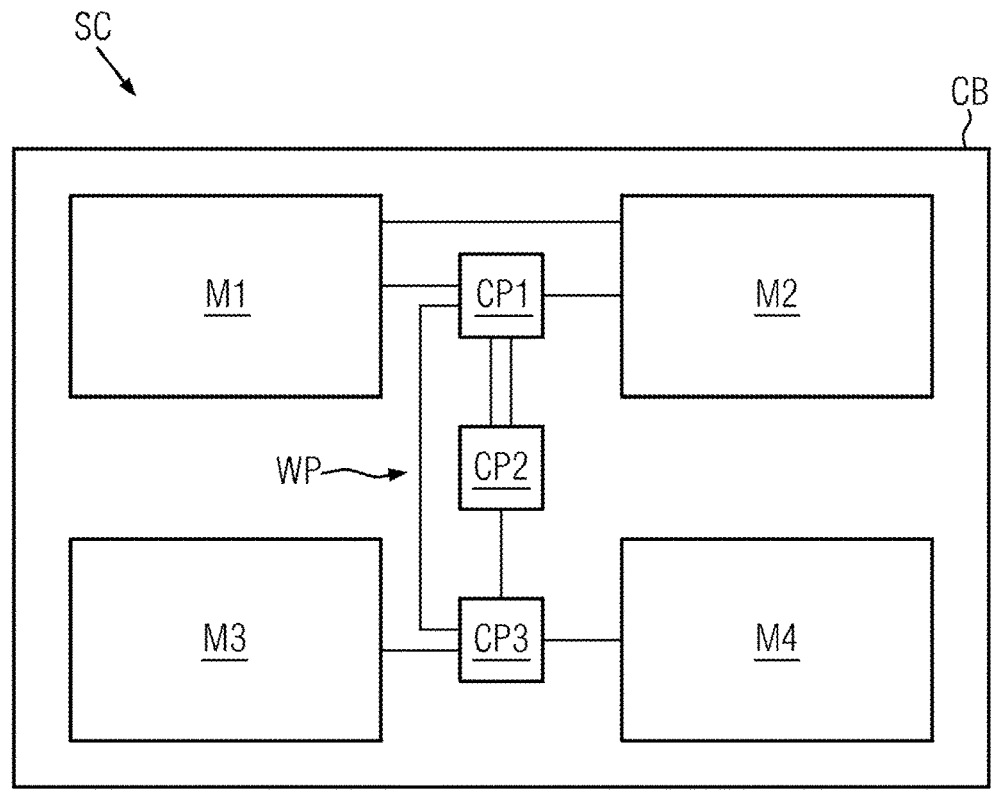
FIG. 9 schematically shows a smart card in accordance with some illustrative embodiments of the present disclosure.

Referring to FIG. 9, a smart card SC is schematically illustrated in block diagrammatic form. The smart card SC is obtained from a card body, such as the card body CB in FIGS. 4 and 5 as described above, by integrating one or more electronic modules, e.g. M1, M2, M3 and M4 into the card body. For example, one or more electronic modules may be integrated into a card body by forming one or more cavities (not illustrated) in a surface of the card body and inserting the one or more electronic modules into the one or more cavities (not illustrated) such that each electronic module is accommodated into a dedicated cavity (not illustrated). Illustrative examples for electronic modules are a chip, an LED, a display, a fingerprint sensor, and the like.

Furthermore, the card body CB has at least one contact terminal patch, e.g., at least one of the contact terminal patches CP1, CP2, CP3 as shown in FIG. 9 integrated therein prior to having integrated the electronic modules M1 to M4 therein. The contact terminal patch(es) may be as described above with regard to any of FIGS. 1 to 8. The card body CB may also have a wiring pattern WP integrated therein. The wiring pattern WP may be given by a wiring layer as described above with regard to FIGS. 3 to 5 as described above.

In accordance with illustrative embodiments of the present disclosure, the at least one contact terminal patch and the wiring pattern WP are integrated into the smart card when forming the card body of the smart card, i.e., before the electronic modules M1 to M4 are integrated into the card body of the smart card. After the integration of electronic modules into the card body CB, the card body CB is referred to "body CB of the smart card SC".

As shown in FIG. 9, the electronic modules M1 to M4 may be interconnected by the wiring pattern WP. For example, the electronic modules M1 and M2 may be directly connected by the wiring pattern WP. Additionally or alternatively, electronic modules may be indirectly connected by the wiring pattern WP and at least one contact terminal patch and/or electronic modules may be in direct contact with one or more contact terminal patches. For example, the contact terminal patches CP1 to CP3 may provide an interconnect pattern for connecting wiring pattern and/or electronic modules. This means that the electronic modules M1 and M2 may be coupled via the wiring pattern WP and the contact terminal patch CP1, such as the electronic modules M3 and M4 may be connected by the wiring pattern WP and the contact terminal patch CP3. The wiring pattern may be connected to contact terminal patches CP1 to CP3 for implementing an antenna coil pattern. In some illustrative examples, one or more electronic modules may be connected with one or more contact terminal patch via a direct electric contact between a one or more backside contacts (not illustrated) of an electronic module and one or more dedicated conductive pads (not illustrated) of one or more contact terminal patch. Herein, a cavity (not illustrated) in a card body, which is formed for accommodating an electronic module, may expose one or more conductive pads (not illustrated) in a card body and, when accommodating the electronic module in the cavity, the exposed one or more conductive pads in the cavity may be brought into electric contact with one or more backside contact (not illustrated) of the electronic module.

After a complete reading of the present disclosure, the person skilled in the art will appreciate that the contact terminal patches, together with a wiring pattern and/or electronic module(s) may be arranged in accordance with the predefined interconnection pattern such that the limited space of the card body CB in the smart card SC may be effectively used for optimizing the amount of modules and wiring patterns integrated into the smart card SC. The position of the contact terminal patches CP1 to CP3 may be set in accordance with a higher accuracy. In turn, conductive pads (not illustrated in FIG. 9) may be provided on each contact terminal patch CP1 to CP3 with a high degree of accuracy independent of a processing to which the smart card SC is exposed. Accordingly, a size and number of conductive pads (not illustrated in FIG. 9) may be scaled without impairing a positioning accuracy of the contact terminal patches CP1 to CP3.

An interconnection between conductive pads of the contact terminal patches, conductive pads (not illustrated) of electronic modules and the wiring pattern is not limited and can be performed by using any known interconnection technology, such as anisotropic or isotropic adhesive bonding, soldering, micro welding and the like.

Figure 10:
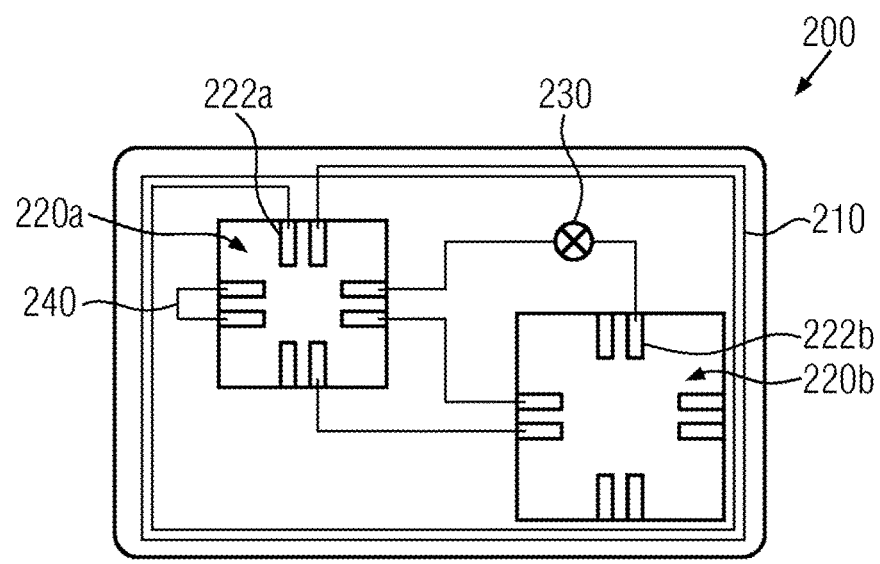
FIG. 10 schematically shows a card body in accordance with some illustrative embodiments of the present disclosure.

With regard to FIG. 10, a card body 200 in accordance with some illustrative embodiments of the present disclosure is schematically shown. As shown in FIG. 10, the card body 200 may comprise a contact terminal patch 220a and a contact terminal patch 220b. Although the two contact terminal patches 220a and 220b are explicitly shown, this does not pose any limitation to the present disclosure and any number of contact terminal patches may be provided, for example, one contact terminal patch or more than two contact terminal patches.

As illustrated in FIG. 10, each of the contact terminal patches 220a, 220b may have a plurality of conductive pads 222a and 222b, respectively. At least one of the plurality of conductive pads 222a of the contact terminal patch 220a and/or at least one of the plurality of conductive pads 222b of the contact terminal patch 220b may be connected to a wiring pattern 210 and/or to an electronic module 230 which is integrated into the card body 200. According to some illustrative examples, the electronic module 230 may be one of an LED, a chip, and the like. For example, the electronic module 230 may be directly connected to at least one of the contact terminal patches 220a and 220b or may be indirectly connected to at least one of the contact terminal patches 220a and 220b. In this regard, FIG. 10 shows an illustrative but non-limiting example in which the electronic module 230 is connected to one conductive pad of the contact terminal patch 220a and one conductive pad of the contact terminal patch 220b.

Although the contact terminal patches 220a and 220b as illustrated in FIG. 10 are similar to the contact terminal patches 1 shown in FIG. 1 of the present disclosure, this does not pose any limitation to the present disclosure and any arrangement of the plurality of conductive pads 222a, 222b on each of the contact terminal patches 220a and 220b other than the explicitly depicted arrangement may be provided instead. For example and without limitation, at least one of the contact terminal patches 220a and 220b may be implemented by one of the contact terminal patches shown in FIG. 8 of the present disclosure.

With continued reference to FIG. 10, the wiring pattern 210 may be provided in the card body to form an antenna structure of an RFID module (not illustrated) and/or a loop 240 by appropriately connecting the wiring pattern 210 with conductive pads of at least one of the contact terminal patches 220a and 220b.

In accordance with some illustrative and non-limiting examples herein, some conductive pads of at least one of the contact terminal patches 220a and 220b may not have any further connection into the card body and may be present for providing a better mechanical stability. As illustrated in FIG. 10, two conductive pads may directly connect the contact terminal patches 220a and 220b. Additionally or alternatively, there may be an indirect connection between the contact terminal patches 220a, 220b and the electronic module 230 which is already integrated into a prelam layer out of which the card body 200 is formed. Furthermore, the contact terminal patch 220a may have two conductive pads of the plurality of conductive pads 222a which are directly connected to each other. This could help to create an interconnection between two components (not illustrated) on modules which are later integrated into the card body 200 in case there are limitations to perform the connection of components (not illustrated) on these modules (not illustrated) directly.

Referring to the card body 200 shown in FIG. 10, a smart card may be fabricated from this card body 200 by integrating an electronic module (not illustrated) into the card body 200 on the position of each of the contact terminal patches 220a and 220b. For example, a smart card (not illustrated) having in total two electronic modules (not illustrated) may be fabricated out of the card body 200 of FIG. 100, wherein these electronic modules (not illustrated) will gain contact to some conductive pads provided by the contact terminal patches 220a and 220b, which conductive pads are unconnected in the illustration of FIG. 10.

Figure 11:
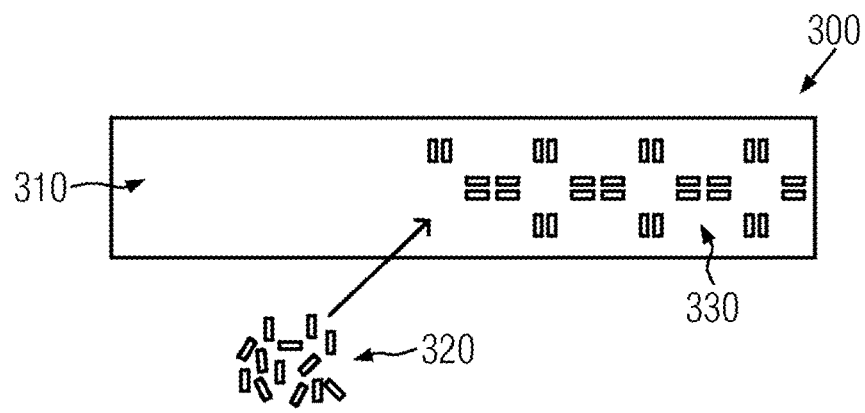
FIG. 11 schematically shows a fabrication of a band of patch base material in accordance with some illustrative embodiments of the present disclosure.

With regard to FIG. 11, an illustrative embodiment for the fabrication of a band 300 having a plurality of conductive pad arrangements 330 formed thereon is schematically shown in a top view. Herein, a plurality of contact terminal patches (not illustrated) may be produced from this band 300 by appropriately cutting the band 300 with the arrangement 330 into band sections. As shown in FIG. 11, a band of base patch material 310 may be provided. The band of base patch material 310 may be provided with a layer of an adhesive material (not illustrated) on an upper surface of the band of patch base material 310. A plurality of conductive pads 320 may be arranged on the band of patch base material 310. For example, the plurality of conductive pads 310 may be pre-manufactured in a desired shape, e.g. by punching out conductive pads with the desired shape from a metal band (not illustrated) or a sheet of metal (not illustrated). After providing the plurality of conductive pads 310, individual conductive pads may be mounted to the band of patch base material 310 in a desired arrangement using a pick and place technique. Each single of the placed conductive pads may be fixed to the band of patch base material 310 in the desired arrangement by curing the adhesive at the placed conductive pad, e.g., by thermally curing or curing by UV light of chemically curing the adhesive at each placed conductive pad. The band 300 with the plurality of conductive pad arrangements 330 may represent an intermediate band rolled up in a reel which may be later provided into a subsequent roll to roll process (e.g., as shown in FIG. 6a or 7a) and the pads may be transferred from band 300 onto a final basic patch layer corresponding to the band B1 in FIG. 6a or B1' in FIG. 7a. In this example, the band 300 rolled up may represent the reel R2 in FIG. 6a or R2' in FIG. 7a.

Figure 12:
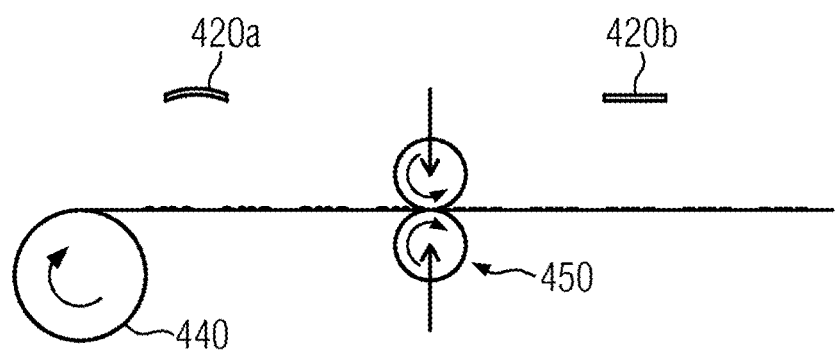
FIG. 12 schematically shows an optional process step in accordance with some illustrative embodiments of the present disclosure.

With regard to FIG. 12, an optional additional process step is shown. This additional process step may be applied when producing a plurality of patches in a reel-to-reel process such as in the context of FIGS. 6 and 7, wherein conductive pads are cut out or punched out from a band of conductive pad material (see bands B2 in FIGS. 6 and B2 in FIG. 7) by means of a rotating cutting or punching tool. When using a rotating cutting or punching tool, conductive pads of a curved shape as shown by reference numeral 420a in FIG. 12, are fabricated due to the cutting or punching geometry of rotating cutting or punching tools. It is noted that such a curved conductive pad 420a is not obtained when performing a cutting or punching process without using a rotating tool. In the process shown in FIG. 12, after mounting the individual conductive pads 420a onto a basic patch layer provided by reel 440 (see also band B1 provided by reel R1 in FIG. 6a-6c and B1' provided by reel R1' in FIG. 7a-7c) it may happen that the conductive pads mounted in a deformed shape due to the rotating cutting process and therefore do not show flat shape which may impair the mechanical attachment of conductive pads to the basic patch layer.

As shown in FIG. 12, a calander process 450 is applied in order to deform the pads when mounted on the patch basis to a substantially flat shape 420b per pressing each patch in between two reels such that the deformation of the conductive pads 420a is corrected.

Figure 13A:
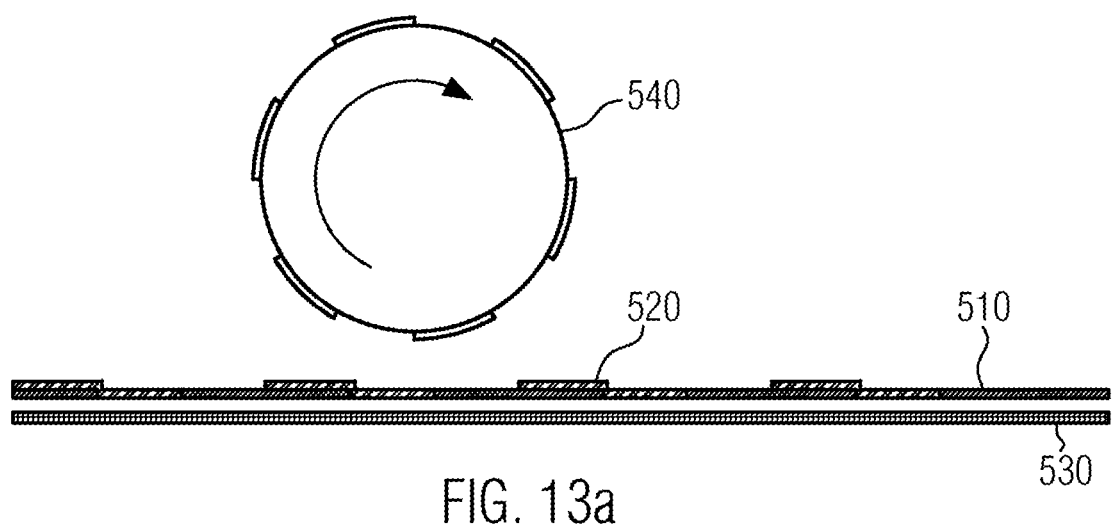
FIG. 13a schematically shows a fabrication of a band of patch base material in accordance with some illustrative embodiments of the present disclosure.
Figure 13B:
FIG. 13b schematically shows a conductive pad structure in accordance with some illustrative embodiments of the present disclosure.

With regard to FIGS. 13a and 13b, another embodiment of 3D shaped conductive pad structure 520 is schematically shown. The 3D shaped conductive pad structure 520 may have a substantially Z-shaped form, e.g., two planar portions connected by a stepping. When integrating the 3D shaped conductive pad structure 520 into a patch base layer 510, an upper planar portion is laying on top of the patch base layer 510, while a lower planar portion is accommodated into a recess of the patch base layer 510 as shown in FIG. 13a. For example, in an illustrative process flow, a band of patch base material (not illustrated) may be provided, such as the band B1 in FIG. 6 or the band B1' in FIG. 7. This band of patch base material (not illustrated) may be subjected to a process of forming at least one recess in the band of patch base material (not illustrated), e.g., a pattern of recesses which may correspond to the bonding holes BH in FIG. 6a. In this example, the bonding holes BH as shown in FIG. 6a may represent according recesses. Alternatively, recesses may be of a greater size than bonding holes, such as lengthy recesses.

Referring to FIG. 13a, a band of conductive pad material (not illustrated) may be provided over the band of patch base material (not illustrated) and, by means of a rotating cutting or punching tool (not illustrated), conductive pad strips (not illustrated) may be cut out or punched out and the conductive pad strips (not illustrated) may be deformed under pressure by a pressing tool 540 such that each conductive pad strip is deformed under pressure into the 3d shaped conductive pad structure 520 with the lower planar portion of the conductive pad structure 520 being deformed using the pressing tool 540 into a recess in the patch base layer 510, and the upper planar portion lying on an upper surface of the patch base layer 510 and laying on top of the patch base layer 510. This process may be used in a reel-to-reel patch manufacturing process in which the 3D shaped conductive pad structure 520 is formed by deforming a part of a conductive pad strip into a recess of the patch base layer 510. It is advantageous that the upper planar portions of each conductive pad 520 on the patch base layer 510 can be positioned in different height levels according to a thickness of a prelam/card body (not illustrated). With the lower planar portion of the conductive pad 520 positioned in the recess of the patch base layer 510, an easier access to contact the conductive pad 520 to the card internal wiring can be provided. The contact to the internal wiring may be protected from becoming damaged in case of milling processes performed when integrating electronic modules (not illustrated) into the card body because the lower planar portion of the 3D shaped conductive pad structure 520 is accommodated at a lower level when compared to the upper planar portion of the conductive pad structure 520 which may be exposed for contacting to backside contacts (not illustrated) of an electronic module (not illustrated).

Referring to FIG. 13a, a liner 530 may be provided below the patch base layer 510 for reasons of mechanically stability, at least temporarily until contact terminal patches (not illustrated) are cut out from the patch base layer 510 after mounting the conductive pads 520 to the patch base layer 510. For example, the liner 530 may be removed prior to laminating the contact terminal patches (not illustrated) with a plurality of conductive pads 520 into a prelam body.

Figure 14:
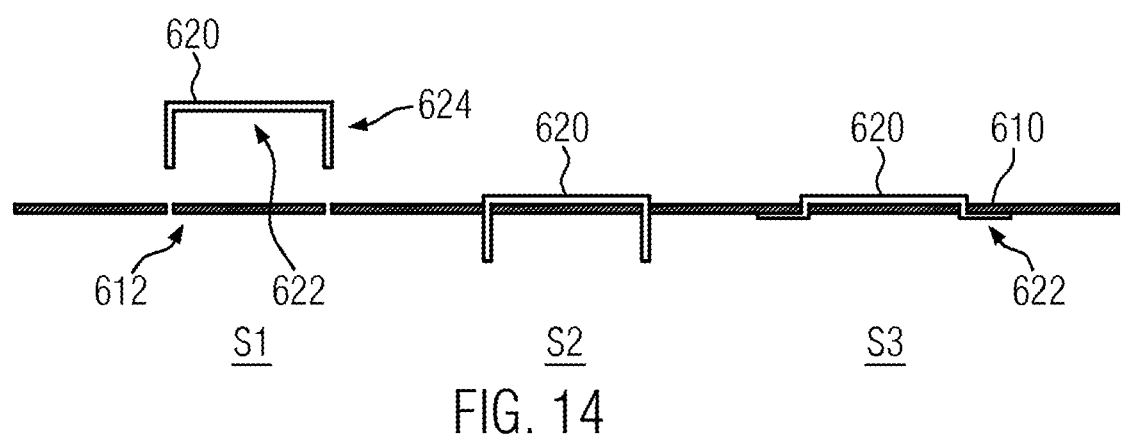
FIG. 14 schematically shows a fabrication of a band of patch base material in accordance with some other illustrative embodiments of the present disclosure.

With regard to FIG. 14, some illustrative embodiments are shown, wherein a 3D shaped conductive pad 620 of a substantially L-shaped or C-shaped (or U-shaped) form is employed. At a step S1 in FIG. 14, the conductive pad 620 is provided. The conductive pad 620 has a planar base portion 622 and at least one leg portion 624 extending perpendicularly to the base portion 622 away from the base portion 622. When mounting the conductive pad 620 to a patch base layer 610, the base portion 622 is arranged to lay on the patch base layer 610, while the leg portion 624 will be oriented substantially perpendicular to the base portion 622.

As illustrated in step S2 of FIG. 14, the leg portion(s) 622 (one leg portion 624 fora conductive pad of a substantially L-shaped form (not illustrated) and two leg portions 624 for a conductive pad of a substantially C-shaped form) are inserted into holes 612 formed in the patch base layer 610 (e.g., holes corresponding to the bonding holes BH in FIGS. 6a to 6c). For example, a pattern of bonding holes 612 may be formed in accordance with the conductive pads 620 such that the conductive pads 620 may be mounted to the patch base layer 610 by inserting the leg portion(s) 624 into the holes 612 of the patch base layer 610.

Subsequently, in a step S3, the leg portion(s) 624 may be deformed to lay alongside a lower surface of the patch base layer 610, while the base portion 622 of the conductive pad 620 lays along an upper surface of the patch base layer 610. Accordingly, the conductive pad 620 is mechanically fixed to the patch base layer 620 and the conductive pad 620 may be contacted from two opposite sides of the patch base layer 610. For example, a contacting to the conductive pad 620 may be achieved by contacting the base portion 622 at the upper surface of the patch base layer, while another contacting may be achieved by contacting the leg portion(s) 624 of the conductive pad 620 at the lower side of the patch base layer 610.

As an advantage of the embodiments of FIG. 14, a crimping of the conductive pad 620 to the patch base layer 610 also realizes a fixing of the conductive pad 620 to the patch base layer 610 without using an additional glue for fixation.

In accordance with some illustrative embodiments, a process may comprise the steps S1 to S3. Such a process may be integrated into any reel-to-reel process as described above. For example, an according process may comprise:
  During a cutting or punching of conductive pads out of a band of contact material, the conductive pads may be deformed into a 3D shape with a base portion and at least one leg extending substantially perpendicularly away from the base portion.
  This 3D shaped pad may then be placed onto a patch base layer by positioning the at least one leg portion into a hole in the patch base layer.
  Subsequently, in a crimping process, the at least one leg portion may be folded to the lay alongside to the patch base layer, whereby fixing the conductive pad to the patch base layer.

The invention claimed is:

1. A method of forming a prelam body of a smart card, the method comprising:
  preparing at least one contact terminal patch, which is formed by a patch base layer and a plurality of conductive pads provided on a surface of the patch base layer, wherein the plurality of conductive pads is arranged on the patch base layer in accordance with a predefined interconnection design;
  preparing a covering layer having formed therein a plurality of openings, each opening being formed such that it accommodates for a dedicated one of the conductive pads;
  mounting the at least one contact terminal patch to the prelam sheet; and
  preparing a prelam sheet, the prelam sheet having at least one recess formed therein, the at least one recess being formed so as to accommodate the at least one contact terminal patch,
  wherein the preparing of the prelam sheet further comprises:
  mounting the covering layer to the prelam sheet in alignment with the plurality of openings such that the at least one contact terminal patch accommodated into the at least one recess in the covering layer is aligned with the plurality of openings in the prelam sheet so as to accommodate the plurality of conductive pads of the at least one contact terminal patch into the plurality of openings of the prelam sheet.

2. The method of claim 1, wherein a thickness of the covering layer is substantially equal to a thickness of the patch base layer of the at least one contact terminal patch.

3. The method of claim 1, wherein a thickness of the prelam sheet is equal to a height of the conductive pads on the patch base layer of the at least one contact terminal patch.

4. The method of claim 1, wherein the preparing of the at least one contact terminal patch comprises:
  preparing the base patch layer with a plurality of bonding holes in alignment with the predefined interconnection design, and subsequently
  forming the plurality of conductive pads on the base patch layer such that each bonding hole is arranged directly below a conductive pad of the plurality of conductive pads.

5. The method of claim 1, wherein the at least one contact terminal patch is prepared in a reel-to-reel process, comprising:
  combining a band of a reel of patch base layer material and a band of a reel of conductive pad material into a stacked configuration such that one of the bands runs on top of the other of the bands; and
  cutting out the plurality of conductive pads from the band of conductive pad material running in the stacked configuration with the band of patch base layer material and equipping the band of patch base layer material with the plurality of conductive pads.

6. The method of claim 5, further comprising subjecting plurality of conductive pads to pressure for at least one of forming the conductive pads into a planar shape and mounting the conductive pads to the band of patch base layer material and deforming at least a portion of each of the conductive pads.

7. The method of claim 5, further comprising:
  rolling-up the cut band of conductive pad material; and
  cutting out at least one contact terminal patch from the band of conductive pad material equipped with the plurality of conductive pads.

8. The method of claim 5, further comprising:
  applying an adhesive coating to the band of conductive pad material prior to combining both bands,
  wherein the plurality of conductive pads is fixed to the band of patch base layer by means of the adhesive coating.

9. The method of claim 8, wherein the adhesive coating is one of:
  i) a curable adhesive, which is thermally curable or UV curable or of a chemically binding type, wherein the method further comprises a curing of the adhesive after equipping the band of patch base layer material with the plurality of conductive pads,
  ii) a component of a two-component adhesive, wherein the other component of the two-component adhesive is applied to the band of conductive pad material prior to equipping the band of patch base layer material, and
  iii) a pressure sensitive adhesive.

10. The method of claim 1, wherein the preparing of the at least one contact terminal patch comprises:
  providing the at least one contact terminal patch with an edge mark.

11. The method of claim 1, further comprising:
  preparing a wiring layer by providing a wiring base layer with a wiring pattern formed on one surface of the wiring base layer; and
  mounting the wiring layer to the prelam sheet having the at least one contact terminal patch mounted thereto, wherein the wiring pattern faces the at least one contact terminal patch.

12. The method of claim 11, wherein the patch base layer of the at least one contact terminal patch has bonding holes formed therein and the wiring layer has bonding holes formed therein, the wiring layer being mounted to the patch base layer of the at least one contact terminal patch such that the bonding holes of the wiring layer and the bonding holes of the patch base layer are aligned so as to substantially fall in line,
wherein the mounting of the wiring layer to the prelam sheet comprises:
bonding wires of the wiring pattern being exposed by the bonding holes of the wiring layer to the conductive pads being exposed by the bonding holes in the patch base layer.

13. The method of claim 11, wherein the wiring layer faces the plurality of conductive pads of the at least one contact terminal patch and wires of the wiring pattern are connected to the plurality of conductive pads mounting the wiring layer to the prelam sheet.

14. The method of claim 11, wherein the wiring pattern alone or the in combination with at least a subset of the plurality of conductive pads realizes an antenna pattern.

15. A method of forming a smart card, comprising:
forming a prelam body in accordance with claim 1;
forming one or more overlay layers on the prelam sheet or on the covering layer, wherein a card body is formed; and
integrating one or more electronic modules into the card body,
wherein the one or more electronic modules and the wiring pattern are at least partly coupled to the at least one contact terminal patch.

16. A prelam body of a smart card, the prelam body comprising:
at least one contact terminal patch, which comprises a patch base layer and a plurality of conductive pads provided on a surface of the patch base layer, wherein the plurality of conductive pads is arranged on the patch base layer in accordance with a predefined interconnection design; and
a covering layer with a plurality of openings, each opening accommodating a dedicated one of the conductive pads, and
a prelam sheet with at least one recess formed therein, the at least one recess accommodating the at least one contact terminal patch, wherein the at least one contact terminal patch is mounted to the prelam sheet,
wherein the covering layer is mounted to the prelam sheet in alignment with the plurality of openings such that the at least one contact terminal patch accommodated into the at least one recess in the covering layer is aligned with the plurality of openings in the prelam sheet, and
wherein the plurality of conductive pads of the at least one contact terminal patch is accommodated into the plurality of openings of the prelam sheet.

17. The prelam body of claim 16, wherein a thickness of the covering layer is substantially equal to a thickness of the patch base layer of the at least one contact terminal patch.

18. The prelam body of claim 16, wherein a thickness of the prelam sheet is equal to a height of the conductive pads on the patch base layer of the at least one contact terminal patch.

19. The prelam body of claim 16, wherein the at least one contact terminal patch comprises a plurality of bonding holes formed in the base patch layer, the bonding holes being in alignment with the predefined interconnection design, wherein each bonding hole is arranged directly below a conductive pad of the plurality of conductive pads.

20. The prelam body of claim 16, wherein the plurality of conductive pads is fixed to the patch base layer by means of an adhesive.

21. The prelam body of claim 16, wherein the at least one contact terminal patch is provided with an edge mark.

22. The prelam body of claim 16, further comprising a wiring layer provided by a wiring pattern formed on one surface of a wiring base layer, wherein the wiring layer is mounted to the prelam sheet facing the at least one contact terminal patch.

23. The prelam body of claim 22, wherein the patch base layer of the at least one contact terminal patch has bonding holes formed therein and the wiring layer further has bonding holes formed therein, the wiring layer being mounted to the patch base layer of the at least one contact terminal patch such that the bonding holes of the wiring layer and the bonding holes of the patch base layer are aligned so as to substantially fall in line, wherein the wires of the wiring pattern are bonded to the conductive pads through the bonding holes.

24. The prelam body of claim 22, wherein the wiring layer faces the plurality of conductive pads of the at least one contact terminal patch and wires of the wiring pattern are connected to the plurality of conductive pads.

25. The prelam body of claim 22, wherein the wiring pattern alone or in combination with at least a subset of the plurality of conductive pads realizes an antenna pattern.

26. The prelam body of claim 16, wherein conductive pads are copper pads in the shape of at least one of a line, an L, a square, a rectangular, a circle and the like when viewed in a top view.

27. The prelam body of claim 16, wherein each of the conductive pads represents a 3D shaped conductive pad structure.

28. The prelam body of claim 27, wherein the patch base layer has a plurality of recesses or holes, into which the conductive pads are partially inserted.

29. A smart card, comprising:
a card body having the prelam body in accordance with claim 16, and one or more overlay layers formed on the prelam sheet or on the covering layer, and
one or more electronic modules integrated into the card body,
wherein the one or more electronic modules and the wiring pattern are at least partly coupled to the at least one contact terminal patch.

* * * * *